United States Patent
Inoue et al.

(10) Patent No.: US 10,995,850 B2
(45) Date of Patent: May 4, 2021

(54) VEHICLE

(71) Applicant: SUBARU CORPORATION, Tokyo (JP)

(72) Inventors: Yoshitsugu Inoue, Tokyo (JP); Mitsuo Aoki, Tokyo (JP); Kyousuke Kuroda, Tokyo (JP); Tomoyuki Yamamuro, Tokyo (JP); Akihito Katsume, Tokyo (JP); Shinya Sagawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 33 days.

(21) Appl. No.: 16/671,866

(22) Filed: Nov. 1, 2019

(65) Prior Publication Data

US 2020/0166124 A1     May 28, 2020

(30) Foreign Application Priority Data

Nov. 27, 2018  (JP) ............................. JP2018-221295

(51) Int. Cl.
*F16H 61/02*  (2006.01)
*F16H 63/34*  (2006.01)

(52) U.S. Cl.
CPC ..... *F16H 61/0213* (2013.01); *F16H 63/3458* (2013.01); *F16H 2061/0279* (2013.01)

(58) Field of Classification Search
CPC ............. F16H 61/0213; F16H 61/3458; F16H 61/3466; F16H 61/3475; F16H 61/3483; F16H 2061/0279
See application file for complete search history.

(56) References Cited

U.S. PATENT DOCUMENTS

| | | | | |
|---|---|---|---|---|
| 4,020,718 A | * | 5/1977 | Miyauchi | F16H 61/0267 477/114 |
| 4,186,627 A | * | 2/1980 | Kuramochi | F16H 61/04 477/125 |
| 4,903,550 A | * | 2/1990 | Kuwayama | F16H 61/0206 477/132 |
| 5,487,708 A | * | 1/1996 | Marusue | F16H 61/0206 475/116 |
| 5,544,538 A | * | 8/1996 | Takagi | F16H 61/0251 137/596.1 |

(Continued)

FOREIGN PATENT DOCUMENTS

JP        07-253156 A       10/1995

*Primary Examiner* — Tinh Dang
(74) *Attorney, Agent, or Firm* — McDermott Will & Emery LLP

(57) ABSTRACT

A vehicle includes a transmission shiftable by hydraulic pressure, a main oil passage that delivers operating oil, a first oil passage that delivers the operating oil from the main oil passage to the transmission, a first valve that opens/closes the first oil passage, a controller that controls the first valve, a second oil passage that delivers the operating oil from the main oil passage to the transmission, and a manually drivable second valve that opens/closes a section of the first oil passage that is closer to the main oil passage than the first valve and the second oil passage. The second valve is switchable between the automatic control state in which the first oil passage is opened and the second oil passage is closed and the manual control state in which the first oil passage is closed and the second oil passage is opened.

18 Claims, 5 Drawing Sheets

(56) References Cited

U.S. PATENT DOCUMENTS

| | | | | |
|---|---|---|---|---|
| 5,649,876 A | * | 7/1997 | Morishita | F16H 61/66259 474/18 |
| 5,665,023 A | * | 9/1997 | Aoki | F16H 61/66259 474/28 |
| 8,790,207 B2 | * | 7/2014 | Shin | F16H 61/0206 475/119 |
| 10,161,520 B2 | * | 12/2018 | Hwang | F16H 61/00 |
| 10,443,718 B2 | * | 10/2019 | Hwang | F15B 11/17 |

* cited by examiner

VEHICLE

CROSS-REFERENCE TO RELATED APPLICATIONS

The present application claims priority from Japanese Patent Application No. 2018-221295 filed on Nov. 27, 2018, the entire contents of which are hereby incorporated by reference.

BACKGROUND

The disclosure relates to a vehicle.

Some vehicles are provided with a shift-by-wire transmission. Japanese Unexamined Patent Application Publication No. H07-253156, for instance, discloses a hydraulic controller in which motor power is used to axially displace a camshaft in an integrated valve and thereby open/close a plurality of spool valves in the integrated valve. The oil pressure of operating oil supplied to the clutch of the transmission is controlled according to whether the plurality of spool valves are opened or closed. The oil pressure is used to engage the clutch.

SUMMARY

An aspect of the disclosure provides a vehicle including a transmission, a main oil passage, a first oil passage, a first valve, a controller, a second oil passage, and a second valve. The transmission is shiftable by hydraulic pressure. The main oil passage is configured to deliver operating oil. The first oil passage is configured to deliver the operating oil from the main oil passage to the transmission. The first valve is configured to open and close the first oil passage under control of the controller. The second oil passage is configured to deliver the operating oil from the main oil passage to the transmission. The second valve is manually drivable and is configured to open and close a section of the first oil passage and the second oil passage, and switchable at least between an automatic control state and a manual control state. The section is closer to the main oil passage than the first valve. The automatic control state is a state in which the first oil passage is opened and the second oil passage is closed. The manual control state is a state in which the first oil passage is closed and the second oil passage is opened.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

Figure 1:
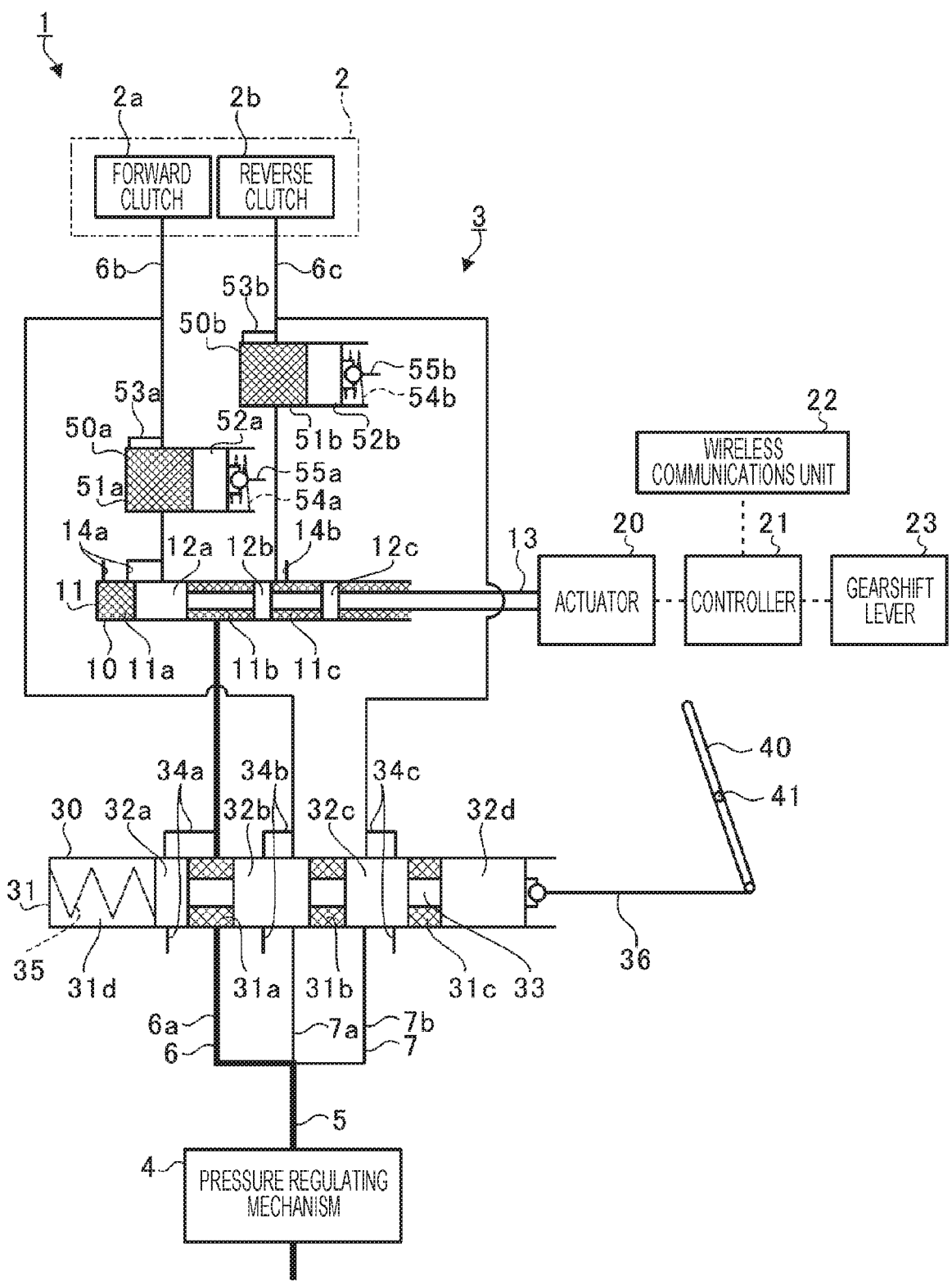
FIG. 1 is a schematic diagram of a hydraulic mechanism that controls a transmission of a vehicle according to an embodiment of the disclosure.

In the following, a preferred but non-limiting embodiment of the disclosure is described in detail with reference to the accompanying drawings. Note that sizes, materials, specific values, and any other factors illustrated in the embodiment are illustrative for easier understanding of the disclosure, and are not intended to limit the scope of the disclosure unless otherwise specifically stated. Further, elements in the following example embodiment which are not recited in a most-generic independent claim of the disclosure are optional and may be provided on an as-needed basis. Throughout the present specification and the drawings, elements having substantially the same function and configuration are denoted with the same reference numerals to avoid any redundant description. Further, elements that are not directly related to the disclosure are unillustrated in the drawings. The drawings are schematic and are not intended to be drawn to scale.

If a transmission valve is automatically controlled by an electric motor or other actuator, it is conceivable that a mechanism for switching the valve with a manual lever is provided to deal with a possible abnormality with the controller. However, if the valve is opened or closed against the force of the actuator in a case of an abnormality, a force greater than an actuator's force is required, and exerting such a force is not an easy thing to do.

It is desirable to provide a vehicle that enables easy manual control of the transmission in case of an abnormality.

FIG. 1 is a schematic diagram of a hydraulic mechanism 3 that controls a transmission 2 of a vehicle 1. As illustrated in FIG. 1, the transmission 2 includes a forward clutch 2a that is engaged to let the vehicle 1 move forward and a reverse clutch 2b that is engaged to let the vehicle 1 move backward. The hydraulic mechanism 3 supplies operating oil to the forward clutch 2a and the reverse clutch 2b. The forward clutch 2a and the reverse clutch 2b are engaged and/or disengaged by oil pressure of the operating oil. The transmission 2 has a shift-by-wire system and is shifted by the oil pressure of the operating oil supplied to the forward clutch 2a and the reverse clutch 2b.

The hydraulic mechanism 3 includes a pressure-regulating mechanism 4. The pressure-regulating mechanism 4 boosts the operating oil pumped up from an oil pan (not illustrated) to a predetermined line pressure level, thereby performing pressure regulation. One end of a main oil passage 5 is coupled to the pressure-regulating mechanism 4. The operating oil that has undergone the pressure regulation is supplied to the main oil passage 5. The other end of the main oil passage 5 is coupled to a first oil passage 6 and a second oil passage 7.

The first oil passage 6 is provided with a first valve 10. The first oil passage 6 includes a pre-branching oil passage 6a, a first forward communication path 6b, and a first reverse communication path 6c. The pre-branching oil passage 6a is a section in the first oil passage 6, the section being located closer to the main oil passage 5 than the first valve 10, and is coupled to the main oil passage 5. The first forward communication path 6b and the first reverse communication path 6c are sections in the first oil passage 6, the sections being closer to the transmission 2 than the first valve 10. The first forward communication path 6b is in communication with the forward clutch 2a and the first reverse communication path 6c is in communication with the reverse clutch 2b.

The second oil passage 7 includes a second forward communication path 7a and a second reverse communication path 7b. The second forward communication path 7a is in communication with the first forward communication path 6b and is also in communication with the forward clutch 2a via the first forward communication path 6b. The second forward communication path 7b is in communication with the first reverse communication path 6c and is also in communication with the reverse clutch 2b via the first reverse communication path 6c.

The first valve 10 includes a sleeve 11, a spool having lands 12a, 12b, 12c, and a rod 13 that drives the spool. The lands 12a, 12b, 12c are provided on the rod 13 so as to be axially spaced apart from each other (in the lateral direction illustrated in FIG. 1). The lands 12a, 12b, 12c are inserted into the sleeve 11. The sleeve 11 has oil chambers 11a, 11b, 11c formed therein that are separated by the lands 12a, 12b, 12c.

First relief oil passages 14a, the first forward communication path 6b, the pre-branching oil passage 6a, the first reverse communication path 6c, and a first relief oil passage 14b are coupled to the first valve 10 in sequence in a left-to-right order illustrated in FIG. 1. The first relief oil passages 14a include a section coupled to the first forward communication path 6b and another section that is in communication with the oil pan (not illustrated), both of which are coupled to the first valve 10. The first relief oil passage 14b is in communication with the oil pan (not illustrated). These oil passages are closed when opposing the lands 12a, 12b, 12c.

The rod 13 is coupled to an actuator 20. The actuator 20 consists of, for instance, an electric motor that moves the rod 13 in the axial direction. A controller 21 consists of a microcomputer that includes a central processing unit (CPU), a ROM that stores programs therein, a RAM functioning as a work area, and the like.

A wireless communications unit 22 establishes wireless communication with, for instance, an external server. Such communication uses, for instance, Wi-Fi (registered trade name). The controller 21 transmits/receives various pieces of data to/from the external server or the like via the wireless communications unit 22.

A gearshift lever 23 is provided in a passenger compartment of the vehicle 1. If the gearshift lever 23 receives input for shifting operation, a signal indicating the shifting operation is output to the controller 21. In response to the input for shifting operation, the controller 21 controls the actuator 20 and also controls the forward clutch 2a and the reverse clutch 2b via the actuator 20. Descriptions of the forward clutch 2a and the reverse clutch 2b only of the transmission 2 are provided herein, and descriptions of the other components (including a pulley and the like that are run by hydraulic pressure if the transmission 2 is a CVT (Continuously Variable Transmission)) of the transmission 2 that are controlled by the controller 21 are omitted.

A second valve 30 includes a sleeve 31, a spool having lands 32a, 32b, 32c, 32d, and a rod 33 that drives the spool. The lands 32a, 32b, 32c, 32d are provided on the rod 33 so as to be axially spaced apart from each other (in the lateral direction in FIG. 1). The lands 32a, 32b, 32c, 32d are inserted into the sleeve 31. The sleeve 31 has oil chambers 31a, 31b, 31c, separated by the lands 32a, 32b, 32c, 32d, and a spring chamber 31d formed therein.

Second relief oil passages 34a, the pre-branching oil passage 6a, second relief oil passages 34b, a second forward communication path 7a, a second reverse communication path 7b, and second relief oil passages 34c are coupled to the second valve 30 in sequence in a left-to-right fashion illustrated in FIG. 1. The second relief oil passages 34a include a section coupled to the pre-branching oil passage 6a and another section that is in communication with the oil pan (not illustrated), both of which are coupled to the second valve 30.

The second relief oil passages 34b include a section coupled to the second forward communication path 7a and another section that is in communication with the oil pan (not illustrated), both of which are coupled to the second valve 30. The second relief oil passages 34c include a section coupled to the second reverse communication path 7b and another section that is in communication with the oil pan (not illustrated), both of which are coupled to the second valve 30.

The pre-branching oil passage 6a, the second forward communication path 7a, and the second reverse communication path 7b extend toward the main oil passage 5 and also extend toward the transmission 2 across the second valve 30. In other words, the second valve 30 is provided halfway along the pre-branching oil passage 6a, the second forward communication path 7a, and the second reverse communication path 7b.

These oil passages coupled to the second valve 30 are closed when opposing the lands 32a, 32b, 32c, 32d.

A spring 35 is disposed in the spring chamber 31d. One end of the spring 35 is secured to the sleeve 31, while the other end of the spring 35 is secured to the land 32a. The spring 35 pulls the land 32a (away from a wire 36) to the left in FIG. 1.

The wire 36 is coupled to the land 32d and a manual lever 40. The manual lever 40 is provided in, for instance, the passenger compartment of the vehicle 1 and is manually pivoted (rotated) around a rotational shaft 41. As the manual lever 40 is moved, the lands 32a, 32b, 32c, 32d and the rod 33 are accordingly moved in the axial direction of the rod 33.

If the manual lever 40 is rotated, for instance, clockwise in the state illustrated in FIG. 1, the lands 32a, 32b, 32c, 32d and the rod 33 are moved to the left by the elastic force of the spring 35. On the contrary, if the manual lever 40 is rotated counterclockwise, the lands 32a, 32b, 32c, 32d and the rod 33 are moved to the right against the elastic force of the spring 35. Although the above description is premised on the use of the spring 35, the spring 35 may be omitted if the wire 36 is sufficiently rigid or if the rod 33, not the wire 36, extends to the manual lever 40.

A third valve 50a is provided on the first forward communication path 6b so as to be located closer to the first valve 10 than a junction of the first forward communication path 6b and the second forward communication path 7a. A third valve 50b is provided on the first reverse communication path 6c so as to be located closer to the first valve 10 than a junction of the first reverse communication path 6c and the second reverse communication path 7b. The third valves 50a, 50b are so-called on-off valves and have substantially the same structure. Accordingly, in descriptions of a structure of the third valve 50b that is the same as that of the third valves 50a, the suffix "a" of "50a" is replaced with "b" and its detailed descriptions are omitted. Descriptions of the third valve 50b are the same as those of the third valve 50a except that the first forward communication path 6b is replaced with the first reverse communication path 6c.

The third valve 50a includes a sleeve 51 and a land 52a. The land 52a is inserted into the sleeve 51. The sleeve 51 has an oil chamber 51a separated by the land 52a. A third relief oil passage 53a and the first forward communication path 6b are coupled to the third valve 50a in sequence in a left-to-right fashion illustrated in FIG. 1. The third relief oil passage 53a is also coupled to the first forward communication path 6b.

The first forward communication path 6b and the first reverse communication path 6c extend toward the main oil passage 5 across the third valves 50a, 50b and also extend toward the transmission 2. In other words, the third valves 50a, 50b are provided halfway along the first forward communication path 6b and the first reverse communication path 6c. The first forward communication path 6b and the first reverse communication path 6c are closed when opposing the lands 52a, 52b.

A spring 54a is provided on the opposite side of the land 52a from the oil chamber 51a. One end of the spring 54a is secured to the land 52a, while the other end of the spring 54a is secured to the sleeve 51. The spring 54a pushes the land 52a (away from a wire 55a) to the left in FIG. 1.

The wire 55a is coupled to the land 52a and the manual lever 40. If the manual lever 40 is rotated clockwise in the state illustrated in FIG. 1, the land 52a is moved to the left by the elastic force of the spring 54a. On the contrary, if the manual lever 40 is rotated counterclockwise, the land 52a is moved to the right against the elastic force of the spring 54a. Although the above description is premised on the use of the spring 54a, the spring 54a may be omitted if the wire 55a is sufficiently rigid or if a rod, not the wire 55a, is used.

The first valve 10, the second valve 30, and the third valves 50a, 50b will be detailed below with regard to opening and closing.

Figure 2:
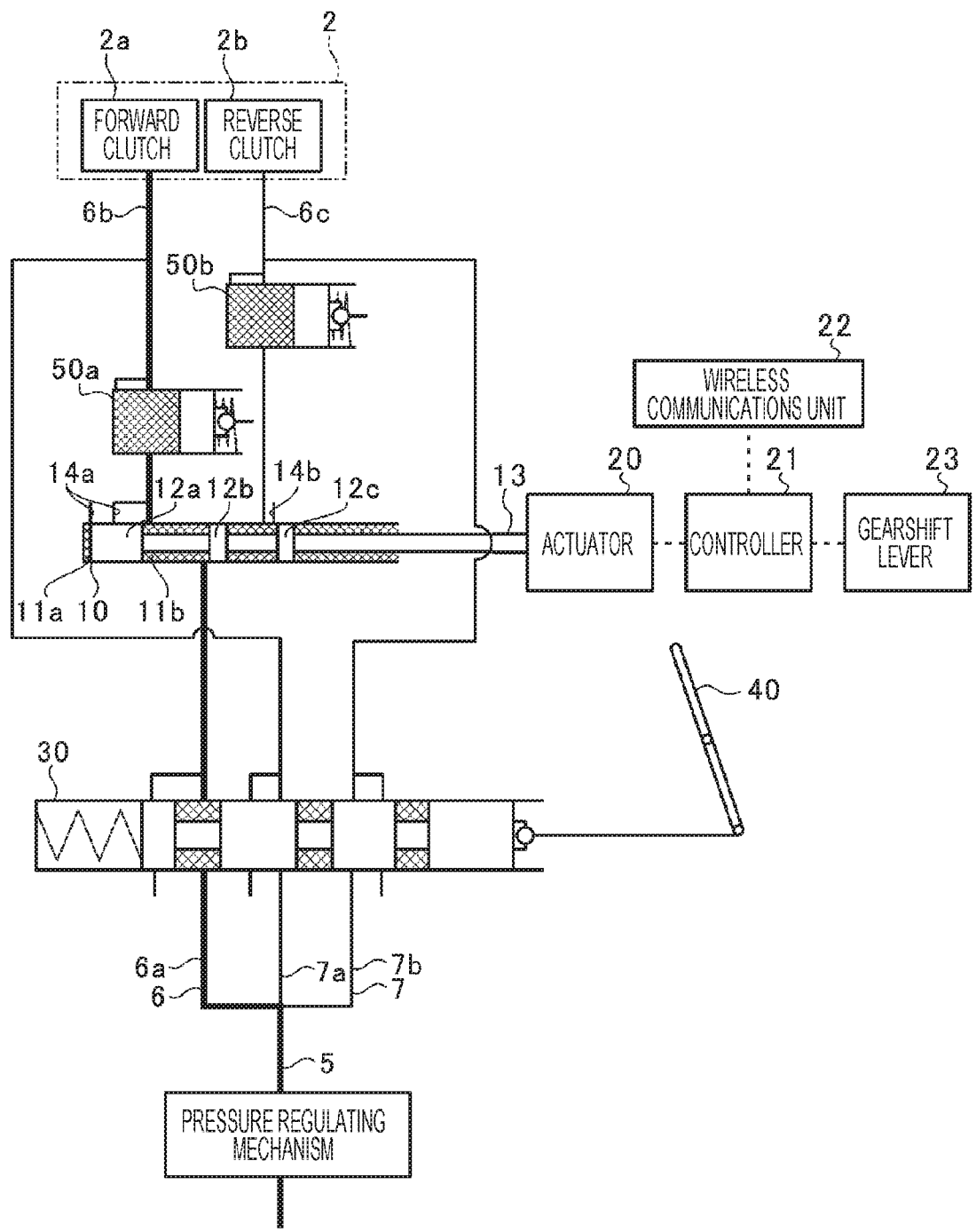
FIG. 2 is a diagram that indicates the state in which hydraulic pressure is applied to a forward clutch under automatic control.
Figure 3:
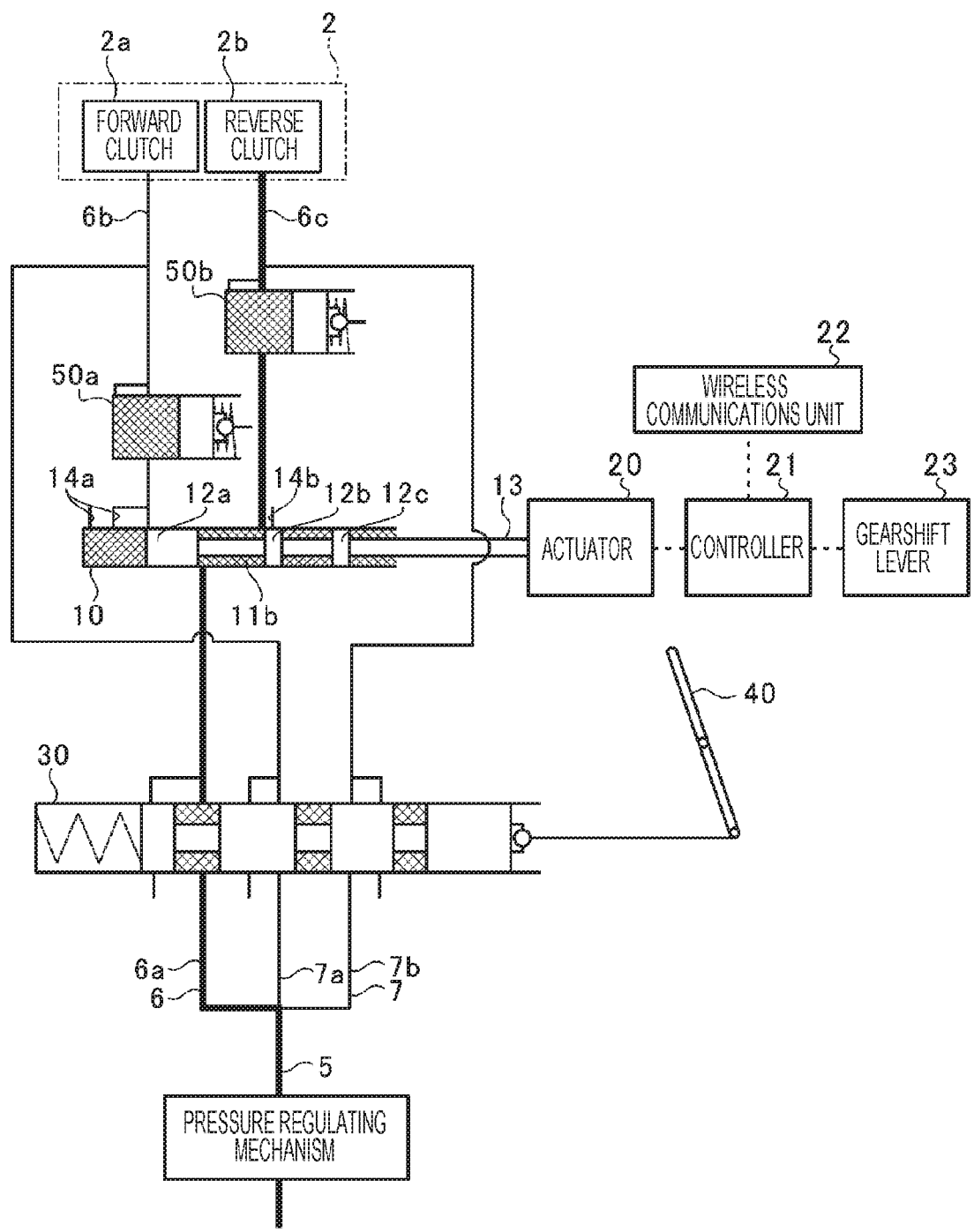
FIG. 3 is a diagram that indicates the state in which hydraulic pressure is applied to a reverse clutch under automatic control.

FIG. 2 is a diagram that indicates the state in which hydraulic pressure is applied to the forward clutch 2a under automatic control. FIG. 3 is a diagram that indicates the state in which hydraulic pressure is applied to the reverse clutch 2b under automatic control. In the states illustrated in FIGS. 1, 2, and 3, the second valve 30 has the first oil passage 6 (pre-branching oil passage 6a) opened and has the second oil passage 7 (the second forward communication path 7a and the second reverse communication path 7b) closed (hereinafter referred to as the automatically controlled state). In addition, the third valves 50a, 50b are in the opened state.

For example, the second valve 30 has the pre-branching oil passage 6a not opposing any of the lands 32a, 32b, 32c, 32d. The other oil passages coupled to the second valve 30 are closed by the lands 32b, 32c, 32d. With this arrangement, operating oil of the main oil passage 5 is delivered to the first valve 10 through the pre-branching oil passage 6a.

In the state illustrated in FIG. 1, the transmission 2 is in the neutral position. The pre-branching oil passage 6a is opened to the oil chamber 11b of the first valve 10. Although the operating oil is delivered to the oil chamber 11b, the oil chamber 11b has no other opened oil passage, resulting in the operating oil remaining in the pre-branching oil passage 6a, as illustrated by bold lines in FIG. 1.

When the gearshift lever 23 receives input for shifting to the forward (drive) position in the state illustrated in FIG. 1, the controller 21 controls the actuator 20 to move the rod 13 to the left, resulting in the state illustrated in FIG. 2. The operating oil remaining in the oil chamber 11a is discharged through the first relief oil passage 14a during this process.

In the state illustrated in FIG. 2, the first forward communication path 6b, in addition to the pre-branching oil passage 6a, is opened to the oil chamber 11b. This causes the operating oil to be delivered to the forward clutch 2a through the pre-branching oil passage 6a and the first forward communication path 6b, as indicated by bold lines in FIG. 2. Consequently, oil pressure is applied to the forward clutch 2a which in turn becomes engaged.

When the gearshift lever 23 receives input for shifting to the neutral position in the state illustrated in FIG. 2, the controller 21 controls the actuator 20 to move the rod 13 to the right, resulting in the state illustrated in FIG. 1. In the state illustrated in FIG. 1, the operating oil is discharged from the first forward communication path 6b through the first relief oil passage 14a, causing the forward clutch 2a to become disengaged.

When the gearshift lever 23 receives input for shifting to the reverse position in the state illustrated in FIG. 1, the controller 21 controls the actuator 20 to move the rod 13 to the right, resulting in the state illustrated in FIG. 3.

In the state illustrated in FIG. 3, the first reverse communication path 6c, in addition to the pre-branching oil passage 6a, is opened to the oil chamber 11b. This causes the operating oil to be delivered to the reverse clutch 2b through the pre-branching oil passage 6a and the first reverse communication path 6c, as indicated by bold lines in FIG. 3. Consequently, oil pressure is applied to the reverse clutch 2b which in turn becomes engaged.

When the gearshift lever 23 receives input for shifting to the neutral position in the state illustrated in FIG. 3, the controller 21 controls the actuator 20 to move the rod 13 to the left, resulting in the state illustrated in FIG. 1. In the state illustrated in FIG. 1, the operating oil is discharged from the first reverse communication path 6c through the first relief oil passage 14b, causing the reverse clutch 2b to become disengaged.

The manual lever 40 is provided to protect against an abnormality with the controller 21, such as, for instance, fraudulent reprogramming of the controller 21 system via the wireless communications unit 22. Control of the transmission 2 by the manual lever 40 will be detailed below.

Figure 4:
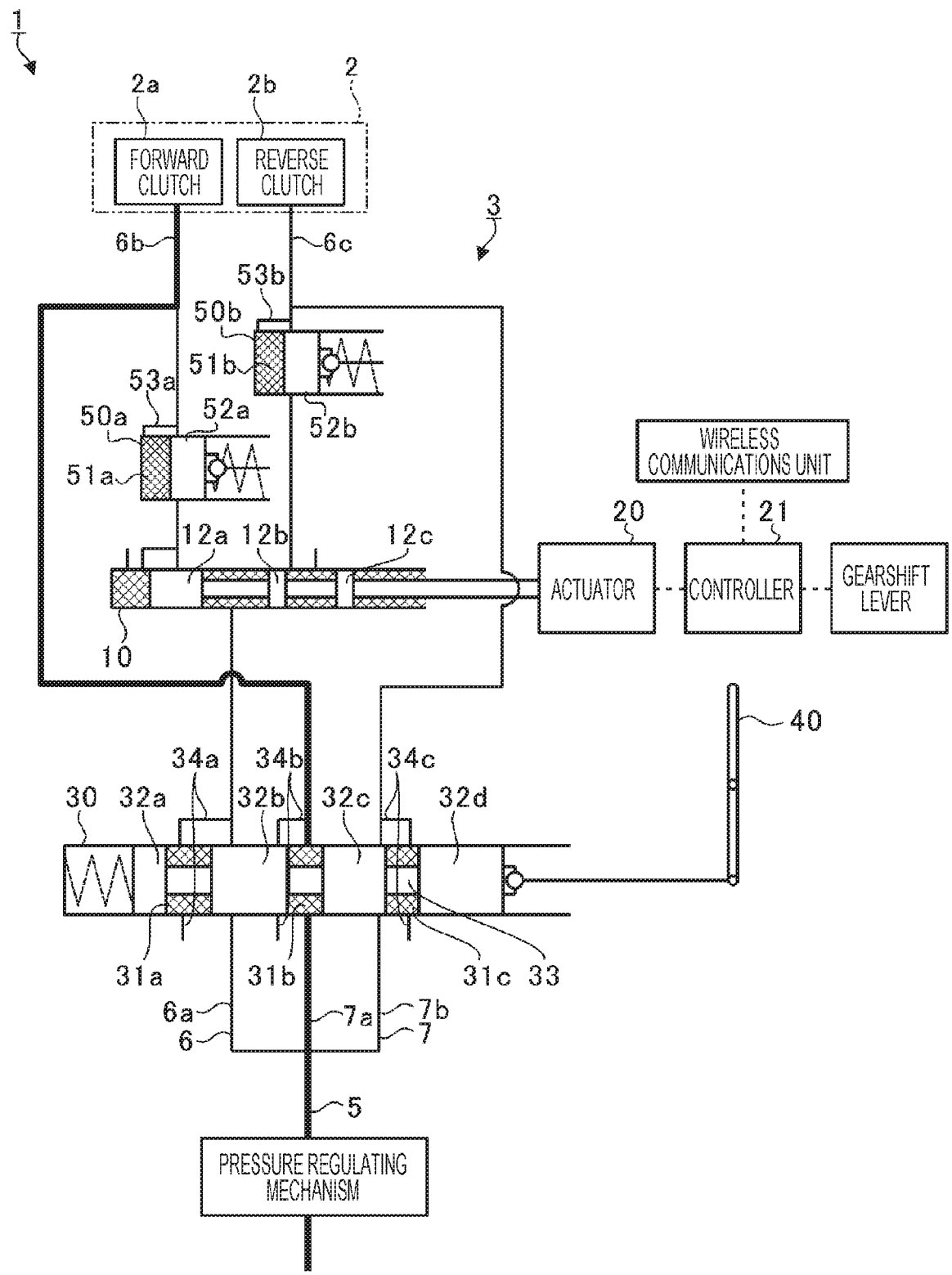
FIG. 4 is a diagram that indicates the state in which hydraulic pressure is manually applied to a forward clutch.
Figure 5:
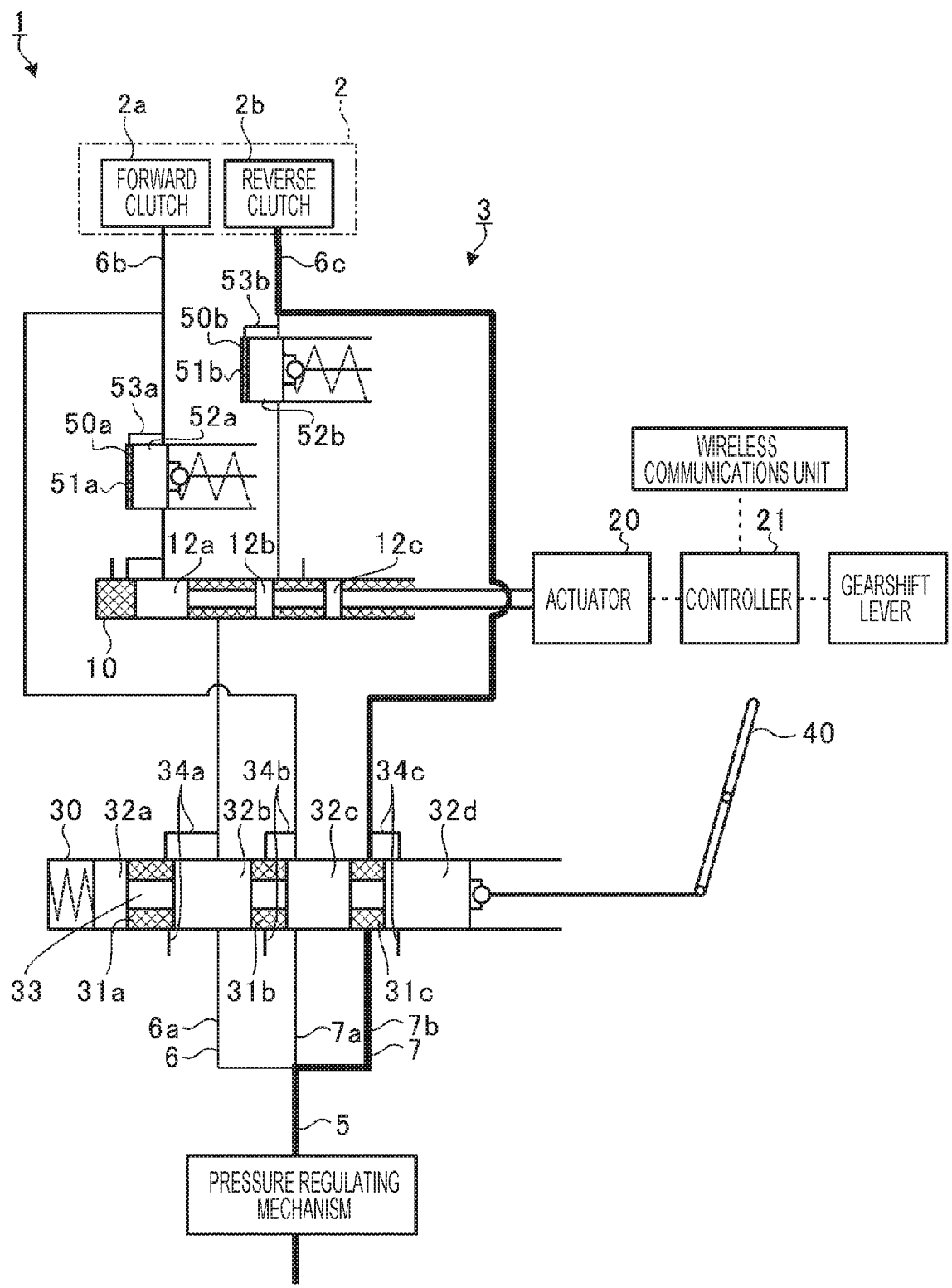
FIG. 5 is a diagram that indicates the state in which hydraulic pressure is manually applied to a reverse clutch.

FIG. 4 is a diagram that indicates the state in which hydraulic pressure is manually applied to the forward clutch 2a. FIG. 5 is a diagram that indicates the state in which hydraulic pressure is manually applied to the reverse clutch 2b. In the states illustrated in FIGS. 4 and 5, the second valve 30 has the first oil passage 6 (pre-branching oil passage 6a) closed and has the second oil passage 7 (one of the second forward communication path 7a and the second reverse communication path 7b) opened (hereinafter referred to as the manually controlled state).

If the manual lever 40 is rotated clockwise in the state illustrated in FIG. 1, the lands 32a, 32b, 32c, 32d and the rod of the second valve 30 are moved to the left. In conjunction with this, the land 52a of the third valve 50a is moved to the left, thereby closing a port that is in communication with the pre-branching oil passage 6b. At the same time, the land 52b of the third valve 50b is also moved to the left, thereby closing a port that is in communication with the first reverse communication path 6c. The operating oil of the oil chambers 51a, 51b is discharged through the third relief oil passages 53a, 53b. Consequently, the second valve and the third valves 50a, 50b are placed in the state illustrated in FIG. 4.

In the valve 30 illustrated in FIG. 4, the pre-branching oil passage 6a is closed by the land 32b. The second relief oil passage 34a is opened to the oil chamber 31a. The operating oil of the pre-branching oil passage 6a is discharged through the second relief oil passage 34a. The second reverse communication path 7b is closed by the land 32c. The second relief oil passage 34c is opened to the oil chamber 31c. The operating oil of the second reverse communication path 7b is discharged through the second relief oil passage 34c.

On the contrary, the second forward communication path 7a is not coupled to the first valve 10. The second relief oil passage 34b is closed by the land 32b. With this arrangement, the operating oil of the main oil passage 5 is delivered to the forward clutch 2a through the second forward communication path 7a without flowing through the first valve 10. Consequently, oil pressure is applied to the forward clutch 2a which in turn becomes engaged.

At this time, since the first forward communication path 6b is closed by the land 52a of the third valve 50a, the operating oil is unlikely to flow back to the first valve 10 through the first forward communication path 6b.

If the manual lever 40 is rotated further clockwise in the state illustrated in FIG. 4, the lands 32a, 32b, 32c, 32d and the rod 33 of the second valve 30 are moved further to the left. In conjunction with this, the land 52a of the third valve 50a is moved further to the left, thereby closing the port that is in communication with the pre-branching oil passage 6b. At the same time, the land 52b of the third valve 50b is also moved further to the left, thereby closing the port that is in communication with the first reverse communication path 6c. The operating oil of the oil chambers 51a, 51b is discharged through the third relief oil passages 53a, 53b. Consequently, the second valve 30 and the third valves 50a, 50b are placed in the state illustrated in FIG. 5.

In the valve 30 illustrated in FIG. 5, the pre-branching oil passage 6a is closed by the land 32b. The second relief oil passage 34a is opened to the oil chamber 31a. The operating oil of the pre-branching oil passage 6a is discharged through the second relief oil passage 34a. The second forward communication path 7a is closed by the land 32c. The second relief oil passage 34b is opened to the oil chamber 31b. The operating oil of the second forward communication path 7a is discharged through the second relief oil passage 34b.

On the contrary, the second reverse communication path 7b is not coupled to the first valve 10. The second relief oil passage 34c is closed by the land 32d. With this arrangement, the operating oil of the main oil passage 5 is delivered to the reverse clutch 2b through the second reverse communication path 7b without flowing through the first valve 10. Consequently, oil pressure is applied to the reverse clutch 2b which in turn becomes engaged.

At this time, since the first reverse communication path 6c is closed by the land 52b of the third valve 50b, the operating oil is unlikely to flow back to the first valve 10 through the first reverse communication path 6c.

As described above, the hydraulic mechanism 3 is provided with the second valve 30 that is located closer to the main oil passage 5 than the first valve 10. Switching the second valve 30 by the manual lever 40 enables operating oil to be delivered to the transmission 2 without flowing through the first valve 10. This arrangement, even if an abnormality occurs in the controller 21, enables the transmission 2 to work with limited functions and, in addition, enables the vehicle 1 to travel to, for instance, a repair garage, thereby avoiding the situation where the vehicle 1 is completely incapable of moving.

It is conceivable that a mechanism for switching the first valve 10 by a manual lever is provided instead of the second valve 30. However, if the valve 10 is opened or closed against the force of the actuator 20, a force greater than the force of the actuator 20 is required, and exerting such a force is not an easy thing to do. It is also conceivable that the enlarged manual lever 40, for instance, is used to enlarge a manual force on the principle of leverage and thereby exert it on the first valve 10. The enlarged manual lever 40, however, makes the passengers of the vehicle feel pressure in the passenger compartment. The use of the second valve 30 enables manual control of the transmission 2 without the need for the enlarged manual lever 40.

The disclosure has been described above in terms of, but not limited to, a preferred embodiment with reference to the attached drawings. It will be readily apparent to those skilled in the art that various changes and modifications can be made within the scope of claims, and it is expressly understood that such changes and modifications fall within the technical categories of the disclosure.

In the afore-mentioned embodiment, the hydraulic mechanism 3 is described in terms of control of hydraulic pressure that is applied to, for instance, the forward clutch 2a and the reverse clutch 2b of the transmission 2. However, the other components of the transmission 2 may be subjected to hydraulic control. Of a plurality oil passages being in communication with the transmission 2, a combination of, for instance, oil passages subjected to hydraulic pressure may used to shift the transmission 2. The hydraulic mechanism 3 may control the hydraulic pressure that is applied to these oil passages.

In addition, in the afore-mentioned embodiment, the first oil passage 6 includes the pre-branching oil passage 6a, the first forward communication path 6b, and the first reverse communication path 6c, while the second oil passage 7 includes the second forward communication path 7a and the second reverse communication path 7b. The first oil passage 6 and the second oil passage 7 are those divided from the main oil passage 5, but these passages may be provided separately from the pressure-regulating mechanism 4. The main oil passage 5 may be divided into three or more oil passages including the first oil passage 6 and the second oil passage 7.

Furthermore, in the afore-mentioned embodiment, the third valves 50a, 50b are manually driven in conjunction with the second valve 30. In this case, an actuator is required to drive the third valves 50a, 50b separately. As described in the afore-mentioned embodiment, such an actuator may be provided at the location of the second valve 30 so as to operate the third valves 50a, 50b in conjunction with the second valve 30.

According to the disclosure, the transmission can be manually controlled with ease in a case of an abnormality.

The invention claimed is:

1. A vehicle comprising:
   a transmission that is shiftable by hydraulic pressure;
   a main oil passage configured to deliver operating oil;
   a first oil passage configured to deliver the operating oil from the main oil passage to the transmission;
   a first valve configured to open and close the first oil passage;
   a controller configured to control the first valve,
   a second oil passage configured to deliver operating oil from the main oil passage to the transmission; and
   a second valve manually drivable and configured to open and close a section of the first oil passage and the second oil passage, and switchable at least between an automatic control state and a manual control state, the section being closer to the main oil passage than the first valve, the automatic control state is being a state in which the first oil passage is opened and the second oil passage is closed, and the manual control state being a state in which the first oil passage is closed and the second oil passage is opened.

2. The vehicle according to claim 1, wherein the first oil passage comprises a pre-branching oil passage that is located closer to the main oil passage than the first valve, a first forward communication path that is located closer to the transmission than the first valve and is in communication with a forward clutch of the transmission, and a first reverse communication path that is located closer to the transmission than the first valve and is in communication with a reverse clutch of the transmission;

wherein the second oil passage comprises a second forward communication path that is in communication with the first forward communication path and a second reverse communication path that is in communication with the first reverse communication path; and wherein, in the manual control state, the second valve is configured to open one of the second forward communication path and the second reverse communication path and close the other.

3. The vehicle according to claim 1, further comprising:
a third valve that is provided on the first oil passage so as to be located closer to the transmission than the first valve and is configured to open the first oil passage when the second valve is in the automatic control state and is configured to close the first oil passage when the second valve in the manual control state.

4. The vehicle according to claim 2, further comprising:
a third valve that is provided on the first oil passage so as to be located closer to the transmission than the first valve and is configured to open the first oil passage when the second valve is in the automatic control state and is configured to close the first oil passage when the second valve in the manual control state.

5. The vehicle according to claim 3,
wherein the third valve is manually drivable in conjunction with the second valve.

6. The vehicle according to claim 4,
wherein the third valve is manually drivable in conjunction with the second valve.

7. The vehicle according to claim 1, further comprising:
a second relief oil passage through which, when the second valve closes the second oil passage, operating oil in the second oil passage, the operating oil being located closer to the transmission than the second valve, is configured to be discharged.

8. The vehicle according to claim 2, further comprising:
a second relief oil passage through which, when the second valve closes the second oil passage, operating oil in the second oil passage, the operating oil being located closer to the transmission than the second valve, is configured to be discharged.

9. The vehicle according to claim 3, further comprising:
a second relief oil passage through which, when the second valve closes the second oil passage, operating oil in the second oil passage, the operating oil being located closer to the transmission than the second valve, is configured to be discharged.

10. The vehicle according to claim 4, further comprising:
a second relief oil passage through which, when the second valve closes the second oil passage, operating oil in the second oil passage, the operating oil being located closer to the transmission than the second valve, is configured to be discharged.

11. The vehicle according to claim 5, further comprising:
a second relief oil passage through which, when the second valve closes the second oil passage, operating oil in the second oil passage, the operating oil being located closer to the transmission than the second valve, is configured to be discharged.

12. The vehicle according to claim 6, further comprising:
a second relief oil passage through which, when the second valve closes the second oil passage, operating oil in the second oil passage, the operating oil being located closer to the transmission than the second valve, is configured to be discharged.

13. The vehicle according to claim 1, comprising:
a first relief oil passage through which, when the first valve closes the first oil passage, operating oil in the first oil passage, the operating oil being located closer to the transmission than the first valve, is configured to be discharged.

14. The vehicle according to claim 2, comprising:
a first relief oil passage through which, when the first valve closes the first oil passage, operating oil in the first oil passage, the operating oil being located closer to the transmission than the first valve, is configured to be discharged.

15. The vehicle according to claim 3, comprising:
a first relief oil passage through which, when the first valve closes the first oil passage, operating oil in the first oil passage, the operating oil being located closer to the transmission than the first valve, is configured to be discharged.

16. The vehicle according to claim 4, comprising:
a first relief oil passage through which, when the first valve closes the first oil passage, operating oil in the first oil passage, the operating oil being located closer to the transmission than the first valve, is configured to be discharged.

17. The vehicle according to claim 5, comprising:
a first relief oil passage through which, when the first valve closes the first oil passage, operating oil in the first oil passage, the operating oil being located closer to the transmission than the first valve, is configured to be discharged.

18. The vehicle according to claim 6, comprising:
a first relief oil passage through which, when the first valve closes the first oil passage, operating oil in the first oil passage, the operating oil being located closer to the transmission than the first valve, is configured to be discharged.

* * * * *